United States Patent

Bourre et al.

[11] Patent Number: 6,133,961
[45] Date of Patent: Oct. 17, 2000

[54] ARCHITECTURE WITH CENTRALIZED SINGLE MEMORY FOR THE TRANSFER OF VIDEO IMAGES

[75] Inventors: Thierry Bourre, Puiseux-Pontoise; Patrick Labranche, Poissy; Mohamed Rebiai, Cormeilles en Parisis; Patrice Bruhat, Uriage, all of France

[73] Assignee: Thomson Broadcast Systems, Cergy-Saint-Christophe, France

[21] Appl. No.: 08/776,384

[22] PCT Filed: Jun. 7, 1996

[86] PCT No.: PCT/FR96/00863

§ 371 Date: Apr. 21, 1997

§ 102(e) Date: Apr. 21, 1997

[87] PCT Pub. No.: WO96/42077

PCT Pub. Date: Dec. 27, 1996

[30] Foreign Application Priority Data

Jun. 8, 1995 [FR] France ................................. 95 06752

[51] Int. Cl.⁷ ........................................................ H04N 5/46
[52] U.S. Cl. .......................... 348/567; 348/714; 348/715; 348/716; 348/722; 345/509; 345/521
[58] Field of Search ..................... 348/711, 567, 348/568, 714, 715, 716, 718, 722; 345/507, 509, 521; 395/290; H04N 5/46, 7/01

[56] References Cited

U.S. PATENT DOCUMENTS

| | | | |
|---|---|---|---|
| 4,724,495 | 2/1988 | Hedberg et al. | 360/22 |
| 5,282,268 | 1/1994 | Mieras et al. | 395/507 |
| 5,369,443 | 11/1994 | Woodham | 348/578 |
| 5,406,311 | 4/1995 | Michelson | 345/200 |
| 5,488,695 | 1/1996 | Cutter | 395/290 |
| 5,537,157 | 7/1996 | Washino et al. | 348/722 |
| 5,596,376 | 1/1997 | Howe | 348/718 |
| 5,673,204 | 9/1997 | Klingelhofer | 348/578 |
| 5,680,156 | 10/1997 | Gove et al. | 345/510 |
| 5,706,290 | 1/1998 | Shaw et al. | 370/465 |
| 5,784,047 | 7/1998 | Cahill, III et al. | 345/127 |

Primary Examiner—John K. Peng
Assistant Examiner—Jean W. Désir
Attorney, Agent, or Firm—Oblon, Spivak, McClelland, Maier & Neustadt, P.C.

[57] ABSTRACT

The invention relates to an architecture making it possible to store and transfer still or moving video images, the said architecture comprising at least one input circuit (E1, E2, . . . , En) allowing access for data intended to make up video images, a memory area (M) making it possible to store video images, at least one video image output circuit (S1, S2, . . . , Sj) and a video bus (B) intended to provide for the transfer of information between the memory area (M), the input circuit and the output circuit, characterized in that the memory area (M) is a general-purpose memory and in that the video bus (B) has a width L greater than or equal to the width of the memory area (M).

The general-purpose memory is operated in a centralized manner by a control circuit (CTRL).

The invention applies to computer platforms dedicated to the transfer of Broadcast quality images or alternatively to video devices for built-up image animation. The architecture according to the invention can also comprise video image processing circuits (T1, T2, . . . , Tn)

14 Claims, 5 Drawing Sheets

ARCHITECTURE WITH CENTRALIZED SINGLE MEMORY FOR THE TRANSFER OF VIDEO IMAGES

The present invention relates to an architecture with multiple input and output paths allowing the storage and transfer of still or moving video images.

More particularly, the invention relates to a novel architecture allowing real-time implementation of the operations mentioned above (transfer, storage) while complying with "Broadcast" quality for the digital video images. "Broadcast" quality should be understood to mean, for example, a representation of the data in the 4:2:2:4 format on 10 bits.

DESCRIPTION OF THE INVENTION

According to the known art, the storage of the video images is carried out with the aid of special-purpose memories, termed "frame memories", better known to those skilled in the art as "frame buffers".

A "frame buffer" is a physically localized memory intended for the video function and specially adapted to the video format for which it was designed. If it is desired to work with several video paths, the information storage system must then be equipped with several special-purpose memories so that to each video path there corresponds a special-purpose memory. If it is desired to have access to a large quantity of information, it is then necessary to multiply up the number of "frame buffers".

Momentary reduced use of the number of video paths then leads to partial utilization of the "frame buffers". This represents a drawback.

Conversely, it is impossible to work in real time on a large number of paths such as, for example, a number of paths equal to 8.

The invention does not have these drawbacks.

SUMMARY OF THE INVENTION

The present invention relates to an architecture making it possible to store and transfer still or moving digital video images, the said architecture comprising at least one input circuit allowing access for data intended to make up a video image, a memory area making it possible to store video images, at least one output circuit making it possible to extract at least one video path from the said architecture and a video bus intended to provide for the transfer of information between the memory area, the input circuit and the output circuit, characterized in that the memory area is a general-purpose memory and in that the video bus has a width greater than or equal to the width of the memory area.

The input circuit allowing access for data intended to make up a video image may be a straightforward video input. It may also be an input making it possible to draw video animations, or else an input of the "bit map" file type.

According to the invention the video frames constituting the various video paths are stored in a single general-purpose memory. "General-purpose" memory should be understood to mean a memory no part of which is particularly dedicated to a path. Depending on the required use, this memory can contain a number of units with several million frames or images. Advantageously the architecture according to the invention allows the simultaneous use of several paths, it being possible for each of them to be constituted by any sequence of frames available in the memory. It is then possible to modify, insert or delete frames in any sequence whatsoever. The output from the system thus obtained can also be recorded in the single memory and become in turn a source sequence.

With the exception of the video formatting/deformatting sub-assemblies, the system is advantageously independent of the dimension of the images, of the scanning system and of the frequencies of the video standard used at output.

BRIEF DESCRIPTION OF THE DRAWINGS

Other characteristics and advantages of the invention will emerge on reading a preferred embodiment given with reference to the appended figures in which.

In all these figures, the same labels denote the same elements.

DESCRIPTION OF THE PREFERRED EMBODIMENTS

Figure 1:
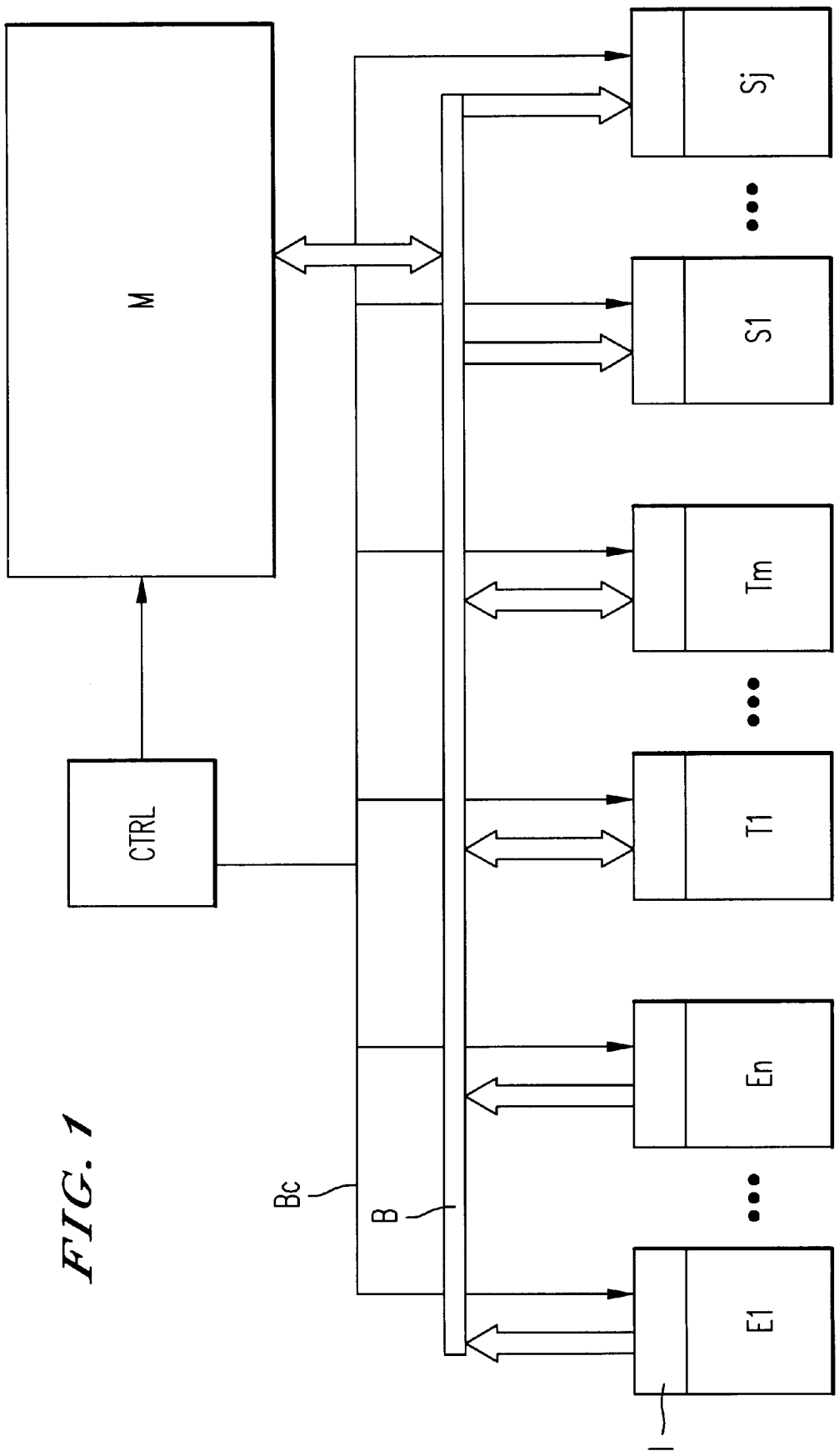
FIG. 1 represents a basic diagram of the architecture according to the invention.

FIG. 1 represents a basic diagram of the architecture according to the invention.

As mentioned previously, the memory M is a single general-purpose memory. By way of example, the memory M can be of the DRAM type. The memory M is organized into words of width L whose size is adapted to the quantity of video frames which it is desired to process at a given instant. Thus the width L is chosen as a function of the access time of the memory and of the bit rate required to be able to process N video channels in real time in a given video scanning system. Preferably, the width L can then be determined as a function of the following parameters:

the pixel frequency of the chosen video standard: F the number of bits per pixel of the video: b the number of video channels processed simultaneously: N the cycle time of the chosen memory technology: Tcy The formula for the width L is then:

$$L = F \times b \times N \times Tcy$$

By way of example, the width L can be 320 bits which, for a DRAM memory working at 27 Mwords/sec and for a number b of bits per pixel equal to 32, leads to a bit rate D equal to 27×320/8 Mbytes/sec i.e. 1080 Mbytes/sec. It is then possible to achieve 20 simultaneous accesses at 54 Mbytes/s.

The memory M is operated in a centralized manner by a control circuit CTRL.

This control circuit allows real-time management of the memory.

The basis of time management of the memory consists in the data of each video path being written or else read in successive packets, each packet being the contents of a memory block, each of the paths being read in rotation. This rotating mechanism of accessing each path can, for example, work at the line frequency since, whatever the frequency of the cycle, preferably, each path will be allotted the same percentage of time, and hence the same bit rate.

According to the preferred embodiment of the invention, the physical space of each block is not defined in advance but is defined by dynamic allocation of free memory at the time of recording. Access via blocks of consecutive words such as is described above advantageously allows sufficient time to be let between each block as to allow the control circuit CTRL to find the next block of each of the paths and to trigger physical transfer of the block.

Advantageously, dynamic management of the memory makes it possible to allocate only the memory necessary for each path on the basis of need. In particular, if a video path is only partly active, the bit rate is reduced and only the necessary memory is consumed. It follows that the architecture according to the invention is particularly well suited to the management of images of variable sizes.

The memory M is connected to a video bus B designed so as to provide for the high video bit rate required.

The video data exchange cycles are driven by the memory M. Preferably, the width of the video bus is equal to the width L of the memory M.

In FIG. 1 are represented not only input circuits (E1, E2, . . . , En) and output circuits (S1, S2, . . . , Sj), but also circuits (T1, T2, . . . , Tm) for processing the video information. The circuits for processing the video information can, for example, be mixing circuits or else compression circuits. Generally, the invention relates equally well to architectures comprising processing circuits as to architectures not comprising processing circuits.

Each input circuit (E1, E2, . . . , En), processing circuit (T1, T2, . . . , Tm) and output circuit (S1, S2, . . . , Sj) is connected to the video bus B by an interface circuit I whose function is to convert a large-width port located on the video bus B side into a video-width port located on the circuit side and operating continuously at normal video frequency.

Such an interface circuit I comprises circuits which are customarily referred to as FIFOs and possesses characteristics which are specific to the problem posed by the nature of the video signals to be processed and will be specified later (cf. FIG. 3).

A control bus BC makes it possible to monitor and control the various interface circuits I.

A synchronization bus (not represented in FIG. 1) dispatches the necessary time references to all the circuits (E1, . . . , En, T1, . . . , Tm, S1, . . . , Sj).

Figure 2:
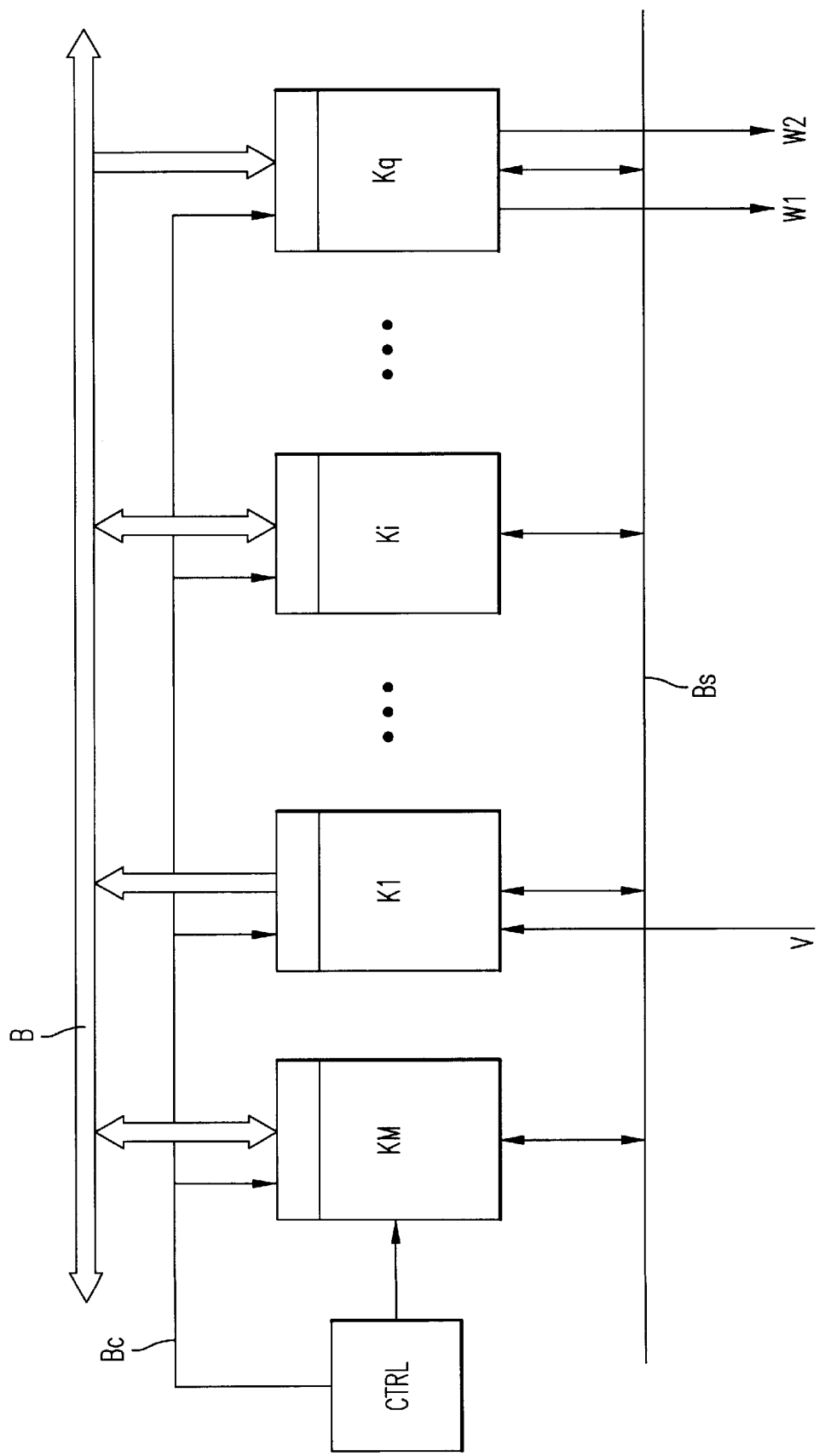
FIG. 2 represents a first application of the architecture according to the invention.

FIG. 2 represents a first application of the architecture according to the invention.

This application relates to a computer platform dedicated to the management of images in the Broadcast sector. The devices concerned are then, for example, photographic libraries, graphics palettes or else moving-picture libraries. One advantage of this first mode of application of the invention is to allow the simultaneous transfer of several video images between the various electronic cards of broadcast video equipment, using a standard computer platform such as, for example, a standard PC platform. As is known to those skilled in the art the initials PC signify "Personal Computer".

Advantageously, such an architecture is inexpensive by virtue of the use of standard hardware and software.

The memory M is here a memory card KM and the various input circuits (E1, E2, . . . , En), processing circuits (T1, T2, . . . , Tm) and output circuits (S1, S2, . . . , Sj) mentioned earlier are electronic cards represented generically here by the symbol Ki (i=1, . . . , q). By way of example the card K1 is an input card allowing video signal access on the input V and the card Kq is a card making it possible to output a video signal on two different outputs W1 and W2.

The card KM and the cards Ki may, for example, be the electronic cards which each user can incorporate into the PC for personal ends. According to the preferred embodiment of the architecture represented in FIG. 2, each PC user can process up to 8 videos of 4:4:4:4 format simultaneously. The capacity of the memory card KM is expandable from 40 to 320 Mbytes.

According to the preferred embodiment, the organization of the card KM allows it, each cycle, read or write access to a block of 4 pixels. The video bus of width L, for example equal to 160 bits, makes it possible to transfer the blocks of 4 pixels each cycle. The memory card KM and the cards Ki are moreover connected to the standard bus BS of the PC.

Advantageously, the video bus is independent of the bus BS of the host computer constituting the PC.

Execution at the bit rate level is obtained, as mentioned previously, through spatial and temporal multiplexing of the data: a compromise between the size of the bus and its operating frequency makes it possible to dimension the characteristics of the multiplexing. According to the chosen preferred embodiment, the transfer of blocks of 4 pixels at a frequency of 25 MHz makes it possible to provide for a mean bit rate of greater than 8 videos of 4:4:4:4 format, 10 bits, in real time.

In a manner known per se, the input card K1 can be adapated to any type of format of the input signal. The same applies for the output card Kq.

The control circuit CTRL is made up on the one hand of a special-purpose electronic circuit localized on the memory card KM and on the other hand of software run by the central processing unit of the host PC. The special-purpose electronic circuit localized on the memory card KM generates all the control signals of the memory card KM, drives the interface circuits I of the cards Ki and operates at high frequencies which are compatible with the transfer rates of the data bus. The software run by the central processing unit of the host PC sends the abovementioned special-purpose electronic circuit the parameters which represent the commands required by the operator utilizing the system.

Advantageously, a computer platform such as that described above makes it possible to offer a user interface under DOS/Windows with the standard utilities and software tools and also the communication tools, and especially the Ethernet or FDDI network, which is capable of providing a computerized customer/server solution which is particularly suited to the needs of still or moving image management in a television studio.

The cards Ki reserved for processing the video information can, for example, be compression cards of the MJPEG, MPEG1 or else MPEG2 type making it possible to optimize the storage and speed of transmission of the images via the network. By way of example, for a memory of 320 Mbytes, the use of an MJPEG compression card makes it possible to achieve a video recording duration of 2 minutes.

The cards Ki can also be cards which make it possible to mix several video signals if the mixing function is desired.

As mentioned previously, the architecture according to the invention can also be devoid of processing cards and include merely input cards and output cards.

Figure 3:
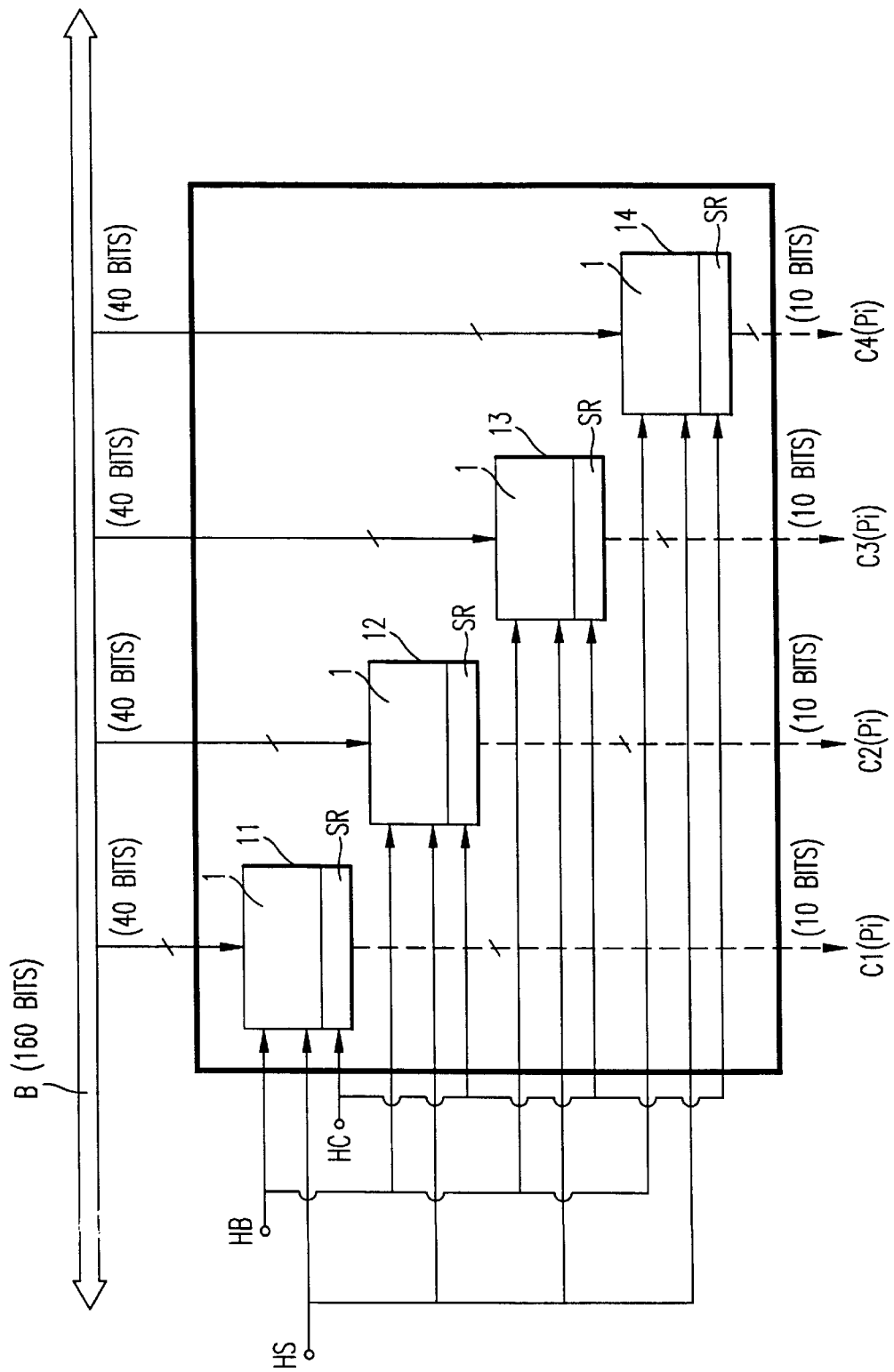
FIG. 3 represents a detail of the architectures of FIGS. 1 and 2.

FIG. 3 represents a detail of the architectures of FIGS. 1 and 2.

FIG. 3 represents an example of an interface circuit I such as those set out in FIGS. 1 and 2. According to this example, the video bus has a width of 160 bits. The interface circuit I makes it possible to process packets of 4 pixels, P1, P2, P3, P4. According to the preferred embodiment, each pixel has four components C1 to C4 each of which is coded on 10 bits. Each interface circuit I comprises 4 circuits 11, 12, 13, 14 each receiving 40 bits on the bus side and restoring 10 on the card side. The 40 bits received by the circuits 11, 12, 13 and 14 are respectively the 4 components C1, the 4 components C2, the 4 components C3 and the 4 components C4 of each of the 4 pixels P1, P2, P3, P4.

Each circuit 11, 12, 13, 14 comprises a circuit 1 of the FIFO type and a rotary selector SR. In a manner known per se, the circuit I also comprises subsidiary circuits, such as bus drivers or control circuits for the FIFOs, and which have not been represented in FIG. 3 so as not to needlessly clutter the drawing.

Clocks HB and HS respectively control the filling and emptying of the bits contained in each FIFO type circuit 1.

A video clock signal HC, the value of which is equal to 4 times the value of the clock signal HS in the example chosen, operates the rotary selector of the respective circuits 11, 12, 13, 14 so as to restore in successive packets the components C1, C2, C3, C4 of the respective pixels Pi (i=1, 2, 3, 4).

More generally, the interface circuit I comprises P circuits 1 of FIFO type and P rotary selectors SR so as to process packets of P pixels. As in the example set out above, each circuit 1 makes it possible to convert a large-width port located on the bus side into a conventional video-width port operating continuously at regular frequency. The value of the video clock signal HC is then equal to P times that of the clock signal HS.

Advantageously, owing to the size of the data packets exiting the memory card KM, the circuits 11, 12, 13, 14 according to the invention can be embodied as discrete components or as ASICs while providing for their function in an optimal manner.

Figure 4:
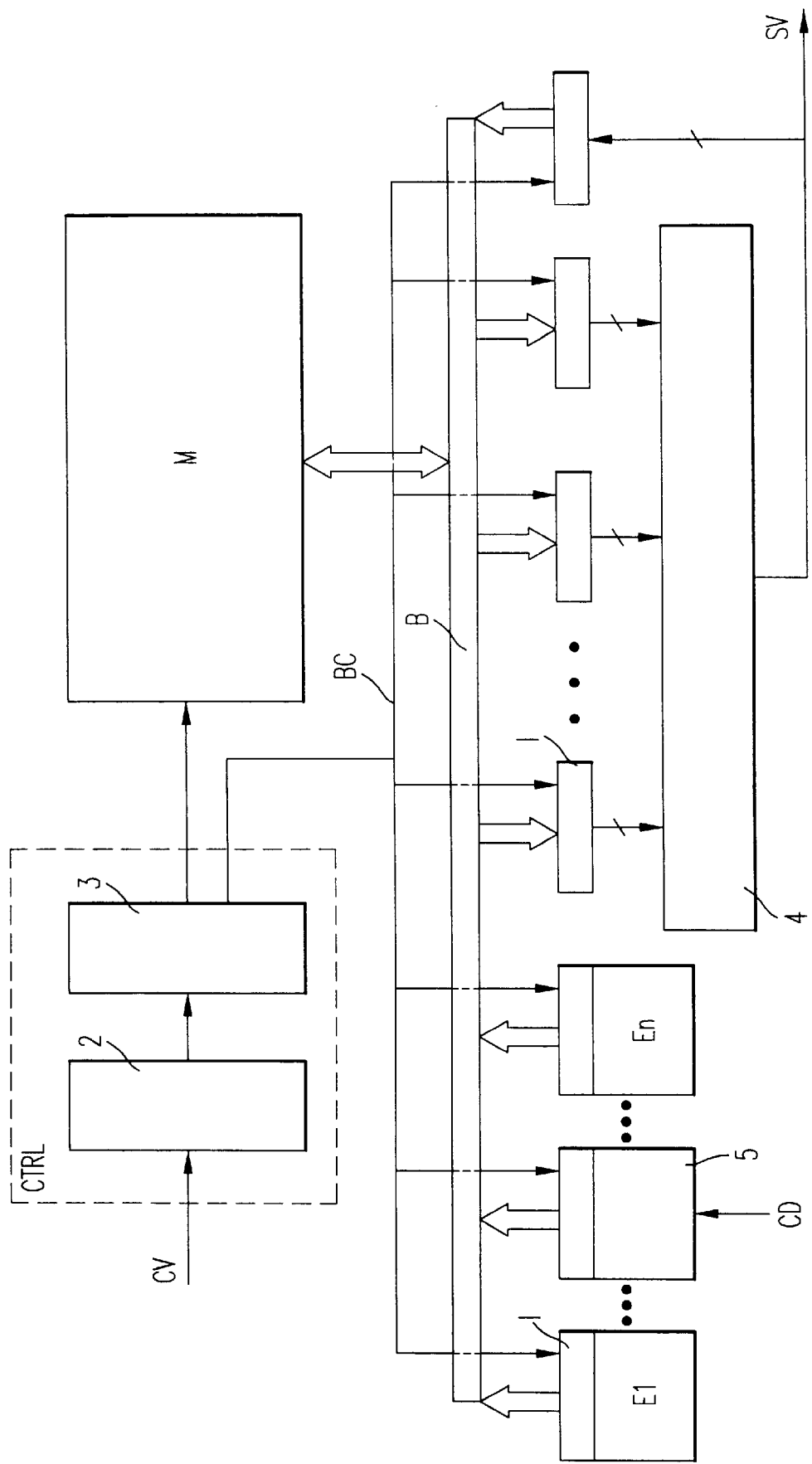
FIGS. 4 and 5 represent 2 different embodiments of a second application of the architecture according to the invention.

FIG. 4 represents a second application of the architecture according to the invention.

According to this second application, the architecture according to the invention makes it possible to draw video animations directly on several independent levels and to tailor the animated sequences in real time. As mentioned previously, the set of video frames constituting the various paths are stored one by one in the single memory M, which can contain from a few units to several million of frames or images. Each of the video frames can be drawn or amended, with simultaneous visual checking, in the global memory without using a frame memory. It is possible to modify, insert or delete frames in any sequence whatsoever.

As mentioned previously, according to the known art, each image or video frame is stored in a well-defined local memory customarily referred to as a "frame buffer". Likewise, in the graphics sector, every graphics system uses the specific notion of an image memory customarily referred to as a "bit map". One advantage of the invention is not only the association of the two different sectors represented by, on the one hand, the digital video sector and, on the other hand, the graphics sector of computer systems, but also the use of one and the same memory to work in real time in these two sectors. According to the preferred embodiment of this second application, the control circuit CTRL of the memory M consists of a special-purpose processor 2 dedicated to the real-time management of the memory and which controls an access handler 3.

The processor 2 receives and executes video scrolling commands CV for each of the paths and manages the allocation and the stringing together of the blocks for each path. The processor updates the list of blocks together with their address for each of the paths and can thus trigger the transfers in read or write mode depending on the direction of the path. The access handler 3 is a generator of blockwise transfer to the memory. It works entirely under the control of the memory management processor which supplies it, for each block, with all the parameters of the transfer, namely:

start address;

block size;

type of transfer (read or write).

The handler 3 behaves as a generator of consecutive memory accesses and, furthermore, supplies, by way of a control bus BC, the control signals making it possible to synchronize the FIFO type circuits contained in the interfaces I.

Advantageously, such a control circuit makes it possible to manage the blocks at high frequencies (of the order of 150 to 300 kblocks/sec). According to the embodiment represented in FIG. 4, one of the input circuits consists of an electronic drawing circuit 5 which allows, under the action of the command CD and with visual checking, the drawing or amending of video frames stored in the memory M.

The architecture of the system which is the subject of the present application makes it possible to act simultaneously on several paths, it being possible for each of them to be constituted by any sequence of frames available in the memory M. The mixing of the video sequences and of the drawings is carried out in a multi-path digital mixer 4. An interface circuit I, such as that described previously, is placed between each video path exiting from the high bit rate bus B and each input path of the digital mixer 4. The desired video signal SV exits from the mixer 4. As represented in FIG. 4, according to the preferred embodiment, the signal SV can be put back into the bus B and become in turn a source sequence. According to other embodiments, the signal SV is not put back into the bus B.

Figure 5:
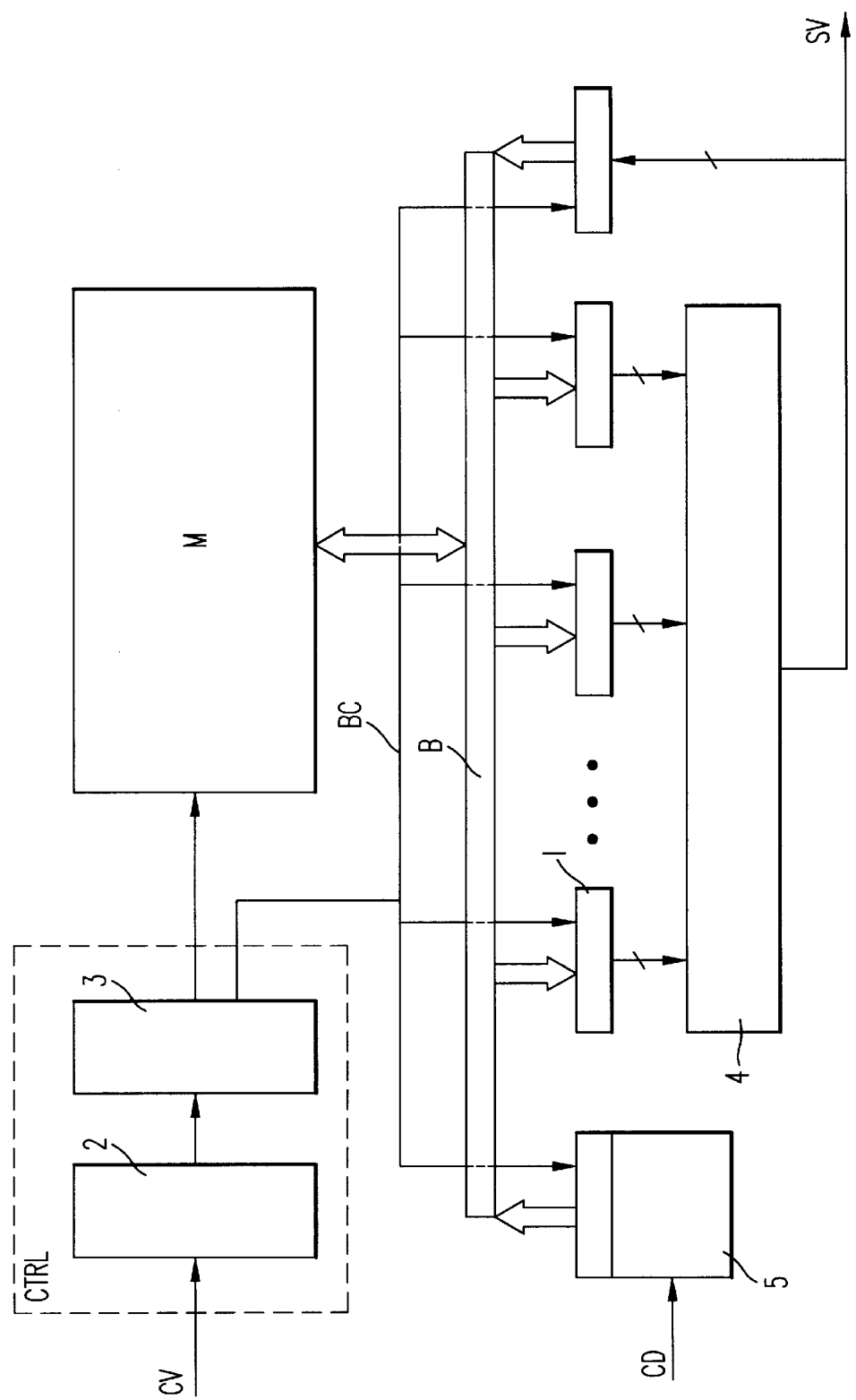

FIG. 5 represents a second embodiment of the second application of the architecture according to the invention.

This embodiment relates exclusively to a video system for built-up image animation. Write access to the memory M is then performed exclusively with electronic drawing devices 5.

All the other constituent elements of this architecture are identical to those described in FIG. 4.

What is claimed is:

1. Architecture making it possible to store and transfer still or moving video images, said architecture comprising:

at least one input circuit configured to provide video data representing said video images;

a memory area configured to store said video data;

at least one video data output circuit; and a video bus configured to provide transfer of said video data between the memory area, the at least one input circuit, and the at least one video data output circuit;

wherein the memory area is a general-purpose memory, wherein the video bus has a width L of an integral number of bits which is greater than or equal to the width of the memory area, wherein the at least one input circuit and the at least one video data output circuit are each connected to the video bus by at least one interface circuit configured to convert an L width port located on the video bus side, and corresponding to a packet of P pixels, into a video-width port relating to said packet width, with P being an integer, and wherein each interface circuit comprises P circuits of FIFO type and P circuits of rotary selector type.

2. Architecture according to claim 1, further comprising a centralized control circuit for the memory area configured such that the video data to be written to or read from the memory area is written or read in successive packets.

3. Architecture according to claim 1, wherein L=160 bits and P=4.

4. Architecture according to claim 1, wherein at least one input circuit is an input circuit for a video path.

5. Architecture according to claim 1, wherein at least one input circuit is an electronic drawing circuit.

6. Architecture according to claim 1, wherein at least one input circuit is an input circuit of the "bit map" file type.

7. Apparatus of Broadcast quality photographic library type using the architecture set out in claim 1.

8. Apparatus of Broadcast quality moving-picture library type using the architecture set out in claim 1.

9. Apparatus of Broadcast quality graphics palette type using the architecture set out in claim 1.

10. Architecture making it possible to store and transfer still or moving video images, said architecture comprising:

at least one input circuit configured to provide video data representing said video images;

a memory area configured to store said video data;

at least one video data output circuit;

a video bus configured to provide transfer of said video data between the memory area, the at least one input circuit, and the at least one video data output circuit; and at least one processing circuit configured to process video data and connected to the video bus by at least one interface circuit, wherein the memory area is a general-purpose memory, wherein the video bus has a width L of an integral number of bits which is greater than or equal to the width of the memory area, wherein the at least one processing circuit is a video multi-path digital mixer comprising one interface circuit per video path, wherein the at least one video data output circuit consists of the output of the digital mixer, and wherein the at least one input circuit is an electronic drawing circuit.

11. Architecture according to claim 10, wherein the output of the multi-path digital mixer is connected to the video bus by way of an interface circuit in such a way that the signal exiting from the digital mixer is a source sequence.

12. Architecture according to claim 10, wherein the centralized control circuit consists of a special-purpose processor dedicated to the real-time management of the memory area and of a memory access handler working under the control of the special-purpose processor and supplying the memory area, for each block, with the transfer parameters of the block, namely: the start address, the block size and the type of transfer.

13. Apparatus for real-time drawing of Broadcast quality video animations using the architecture set out in claim 10.

14. Architecture according to claim 10, wherein said architecture comprises a centralized control circuit for the memory area configured so that data to be written to or read from the memory area is written or read in successive packets.

* * * * *